Figure 1:
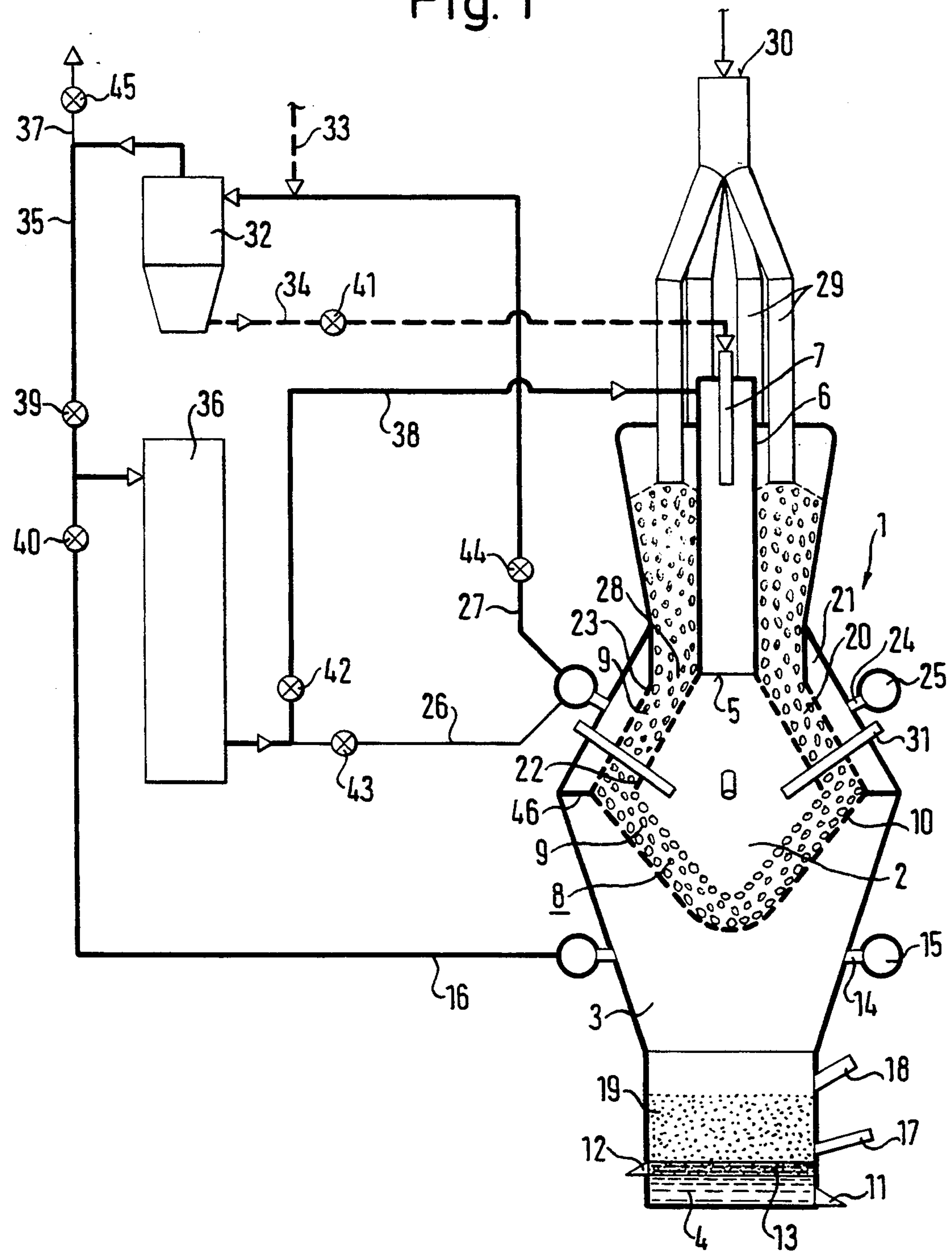

US005364448A

United States Patent [19]

Weber

[11] Patent Number: 5,364,448

[45] Date of Patent: Nov. 15, 1994

[54] PROCESS FOR THE PRODUCTION OF LIQUID METAL FROM FINE-GRAIN METAL OXIDE PARTICLES AND REDUCING AND SMELTING FURNACE FOR CARRYING OUT THE PROCESS

[75] Inventor: Ralph Weber, Rio de Janeiro, Brazil

[73] Assignee: Kortec AG, Zug, Switzerland

[21] Appl. No.: 949,837

[22] PCT Filed: Mar. 13, 1992

[86] PCT No.: PCT/EP92/00551

§ 371 Date: May 3, 1993

§ 102(e) Date: May 3, 1993

[87] PCT Pub. No.: WO92/16663

PCT Pub. Date: Oct. 1, 1992

[30] Foreign Application Priority Data

Mar. 14, 1991 [DE] Germany ............................ 4108283

[51] Int. Cl.[5] ................................................ C22B 4/00

[52] U.S. Cl. ........................................ 75/444; 75/445; 75/448

[58] Field of Search .......................... 75/444, 445, 448

[56] References Cited

U.S. PATENT DOCUMENTS

| | | | |
|---|---|---|---|
| 4,725,308 | 2/1988 | Kepplinger | 75/445 |
| 4,728,360 | 3/1988 | Hauk | 75/445 |
| 4,755,219 | 7/1988 | Hauk | 75/445 |
| 4,793,855 | 12/1988 | Hauk | 75/445 |
| 4,995,904 | 2/1991 | Hauk | 75/445 |

*Primary Examiner*—Peter D. Rosenberg

*Attorney, Agent, or Firm*—Lahive & Cockfield

[57] ABSTRACT

In a process and an apparatus for the production of liquid metal (4) from fine-grain metal oxide particles, the particles, together with hot reducing gas, are blown against a heated bulk material filter layer (9) of lump coal and/or ceramic pieces, a substantial proportion of the particles being retained on and in the filter layer and subjected to finishing reducing by the reducing gas. A high-temperature flame is produced in front of the filter layer (9) by an oxygen-bearing gas being blown against the filter layer, and the metallised particles which are retained in the filter layer are melted. They pass in the liquid condition through the filter layer (9) into a receiving space (3) for liquid metal (4).

16 Claims, 3 Drawing Sheets

30
45
37
33
35
32
34
41
29
7
6
39
36
38
40
44
1
27
28
21
23
20
24
25
9
42
26
5
31
43
22
46
10
9
2
8
15
16
14
3
18
19
17
12
11
4
13

30
45
37
33
35
32
34
41
29
7
39
36
38
6
40
44
28
1
27
23
21
9
20
24
25
42
5
31
22
43
26
46
9
10
8
2
15
16
14
3
18
19
17
12
11
4
13

45
33
37
32
35
34
41
39
36
40
6
7
6
38
100
28
23
22
42
21
26
5
131
2
43
24
27
20
46
47
44
9
8
16
14
10
3
18
19
17
12
11
4
13

PROCESS FOR THE PRODUCTION OF LIQUID METAL FROM FINE-GRAIN METAL OXIDE PARTICLES AND REDUCING AND SMELTING FURNACE FOR CARRYING OUT THE PROCESS

The invention relates to a process as set forth in the classifying portion of claim 1 and a reducing and smelting furnace as set forth in the classifying portion of claim 13.

A process of that kind is known from DE-A-21 32 150. In that process, the fine ore which has been subjected to pre-reduction in a pre-reducing cyclone is subjected to finishing reduction in a finishing reducing cyclone by means of the hot waste gases, essentially consisting of carbon monoxide, from a smelting and refining installation, and then fed as a solid discharge to the smelting and refining installation. In that installation, the solid discharge is melted down, with the simultaneous production of the reducing gas, by incomplete combustion of carbon in excess, and then refined by means of oxygen.

The reduction rate in the finishing reducing cyclone essentially depends on temperature. Because of what is known as the 'sticking effect', that is to say the tendency on the part of fine-grain to dust-form sponge iron to stick together at temperatures above 850° C. however, it is not possible to set the optimum reducing conditions in the finishing reducing cyclone so that hitherto it is not yet technically economically possible to achieve the procedure which is basically ideal, namely high level of metallisation of the fine ore by means of reducing gas at a temperature above 850° C. and subsequent smelting.

In what are known as smelting reducing processes for fine ore, fine ore is reduced in the molten condition. For that purpose, the process disclosed in EP-B1-0 063 924 provides that highly heated air or air which is enriched with oxygen is injected into the lower region of a smelting and reducing furnace which contains a column of coke, whereby high-temperature zones of between 2000° and 2500° C. are formed in front of the nozzles. Disposed above the injection nozzles are further nozzles through which hot pre-reduced fine ore is injected by means of hot air or oxygen. In that situation, the pre-reduced fine ore is firstly oxidised and then melted by the reaction heat in order then to undergo finishing reduction as it sinks down through the bed of coke in counterflow relationship to the hot upwardly moving gases from the high-temperature zone, and to be collected in the liquid condition in the region of the floor. The supply of heat in the lower region of the furnace must be sufficient to prevent unacceptable cooling of the liquefied iron oxide upon reduction during the downward movement in the solids bed.

Pre-reduction of the fine ore takes place in a separate pre-reducing stage or in a pre-reducing stage which is integrated in the smelting and reducing furnace, with the waste gas from the smelting furnace being used as the reducing gas.

The object of the present invent ion is to improve the level of efficiency in a process of the kind set forth in the opening part of this specification, and to permit solids reduction of fine ore above temperatures at which the 'sticking effect' occurs.

The invention further seeks to provide that the total consumption of energy is reduced and excess gas is reduced or eliminated.

The invention further seeks to provide a reducing and smelting furnace for carrying out the process, which is distinguished by a low level of consumption of refractory material for the furnace lining.

The process according to the invention is characterised by the features of claim 1 while the apparatus according to the invention is characterised by the features of claim 13. Advantageous configurations of the process according to the invention and the apparatus according to the invention are set forth in the other claims.

In the process according to the invention, the fine-grain to dust-form metal oxide particles which are blown with hot reducing gas into a final reducing space are retained on a heated bulk material filter layer through which is passed the gas loaded with the particles, and undergo finishing reduction by the reducing gas flowing therepast. In that situation the 'sticking effect' is deliberately tolerated so that it is possible to operate with a reducing gas above 850° C., preferably around 950 ° C., at which the reducing reaction takes place more quickly. The pressure drop at the filter increases due to the material which is deposited on and clings to the filter and which is here reduced to form sponge iron. Then, by blowing an oxygen-bearing gas, preferably mixed with coal dust, against the filter layer, the material clinging thereto is caused to melt, and passes in the fluid condition through the filter layer and is received by a receiving space for liquid metal, which is disposed beneath the filter layer. In that procedure the filter layer is heated above the liquidus temperature of the metal and simultaneously cleaned.

Preferably, before being injected into the final reducing space, the metal oxide particles are heated and pre-reduced in a pre-reducing space of a pre-reducing stage by hot reducing gases in a fluidised bed. The reducing gas used is preferably at least a part of the waste gas from the final reducing space, which has flowed through the filter layer, and/or a part of the waste gas from the receiving space for the liquid metal. It is sufficient if the metal oxide particles are reduced to a residual oxygen content of about 50% in the pre-reducing stage, in which case it is to be noted here that the temperature is kept below the limit at which a noticeable 'sticking effect' occurs. Preferably the metal oxide particles are heated to between 750° and 850° C. in the prereducing stage.

In order to bring the liquid metal in the receiving space to the tapping temperature, it is advantageous for oxygen-bearing gases and fuel, preferably coal in dust form, to be injected above the metal bath. The fuel may also be formed by a fluid bed of coal which is formed above the metal bath, by coal being fed to the receiving space in the upper region. That also produces additional reducing gas.

It has been found advantageous for a gas which is produced in a reformer to be used as the reducing gas with which the metal oxide particles are injected into the final reducing space, in which respect in particular an installation as is described in DE-A-40 28 853 is particularly suitable as the reformer. In that procedure which is referred to as the ENOR-process, reforming of a $CO_2/H_2$-bearing gas is effected with the addition of a gasification agent ( coal or hydrocarbon) in a reactor to which the process heat is supplied by heat carrier particles. The heat carrier particles are heated within a closed circuit in a heater by combustion gases which are produced in a combustion chamber. For that purpose a part of the waste gas from the final reducing space, the receiving space for the liquid metal or the pre-reducing cyclone is fed to the combustion chamber, where it undergoes combustion with air.

The bulk material filter layer which is preferably between 20 and 50 cm in thickness can be formed from solid carbonaceous materials such as coke or refractory materials such as ceramic pieces, or a mixture of both. The essential considerations are gas-permeability and heat resistance of the filter layer. The filter layer can be formed on or between support grids and the applied material of the filter layer can be replaced by a periodic or continuous supply of fresh material.

Preferably, the final reducing space is defined by a filter layer both in an upper region and in a lower region. By virtue of that arrangement, on the one hand the lining of the reducing and smelting furnace is protected from the direct action of the high-temperature flame when melting the sponge iron, while on the other hand there is a simple possibility of supplementing the consumed material of the filter layer in the lower region by material from the filter layer in the upper region, to which fresh material is in turn supplied from above. In the case of a filter layer which contains carbonaceous material in lump form, coarse-grain or lump-form metal oxide particles may also be added to the filter layer, such particles being reduced and melted in the lower region, that is to say in the region which is exposed to the high-temperature flame.

The blast of oxygen-bearing gas against the filter layer may occur both in counter-flow relationship and also in co-flow relationship with the liquid metal which passes through the filter layer, that is to say, the high-temperature flame can be blown against the filter layer from below or from above. Preferably the waste gases from the high-temperature flare are passed through the filter layer in the same direction as the liquefied metal, that is to say the high-temperature flame is directed against the top side of the filter layer and the waste gases flow through the filter layer in the same direction as the reducing gas and the liquid metal. In that respect, the oxygen-bearing gas may be injected into the final reducing space either periodically alternately with reducing gas which is charged with the metal oxide particles, or continuously.

A reducing and smelting furnace which is suitable for carrying out the process includes an upper reducing space and a lower receiving space with a partition wall which is partially formed by a bulk material filter layer which is held by a support grid and which comprises coal in lump form, in particular coke, and/or ceramic pieces, and which represents a gas and material passage between the final reducing space and the receiving space.

Preferably the partition wall between the two spaces is of a configuration such as to converge downwardly.

In accordance with a further configuration of the invention, adjoining the partition wall between the two spaces, in an upward direction, is a further curved partition wall which laterally delimits the reducing space relative to an annular gas space, and which is also at least partially formed by a bulk material filter layer supported by a support grid. A charging opening at the upper edge of the partition wall permits refilling of material for the bulk material filter layer both in the upper region and in the lower region. The partition wall screens the refractory lining of the furnace vessel in the region of the final reducing space, relative to the high-temperature flame.

Figure 2:
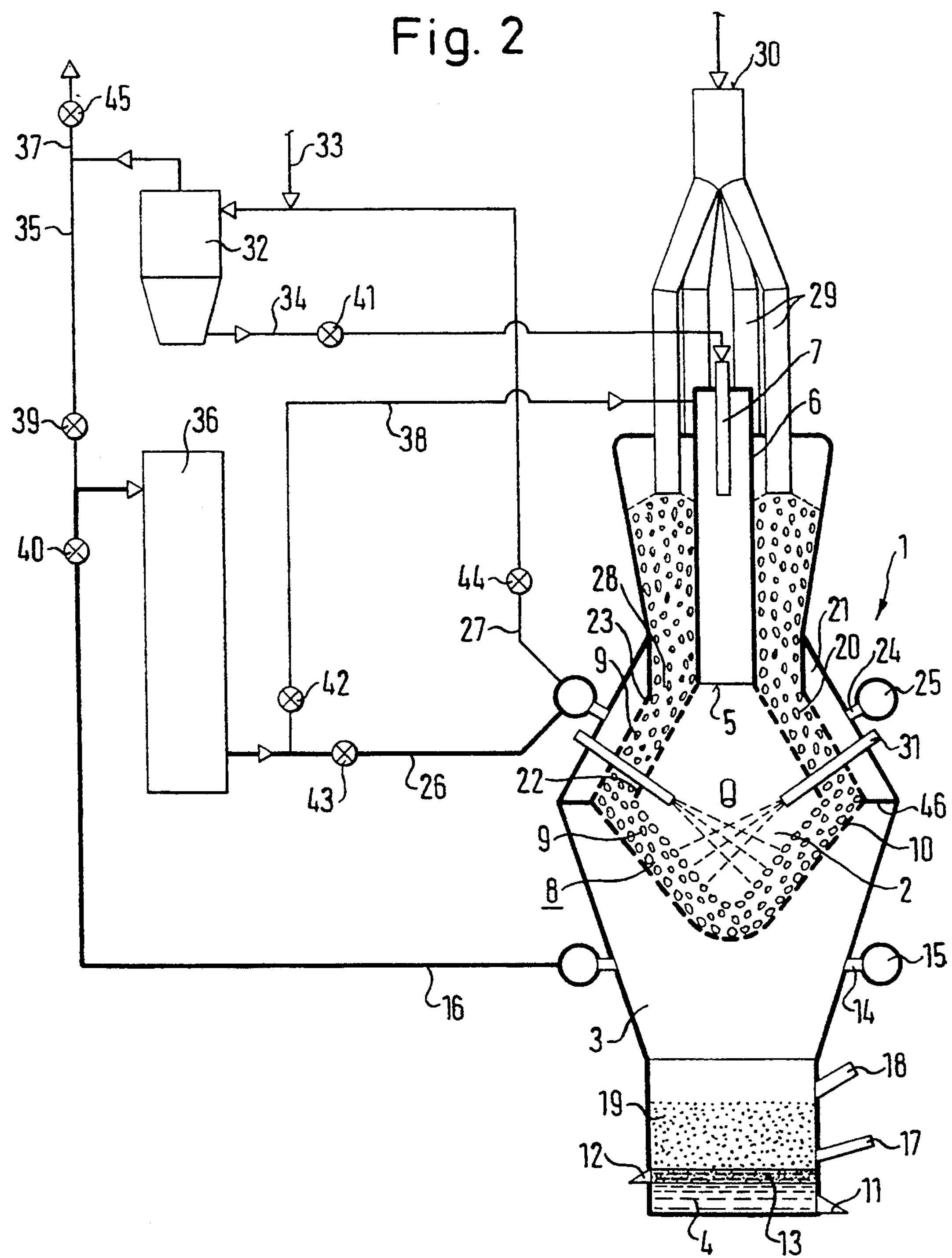
Figure 3:
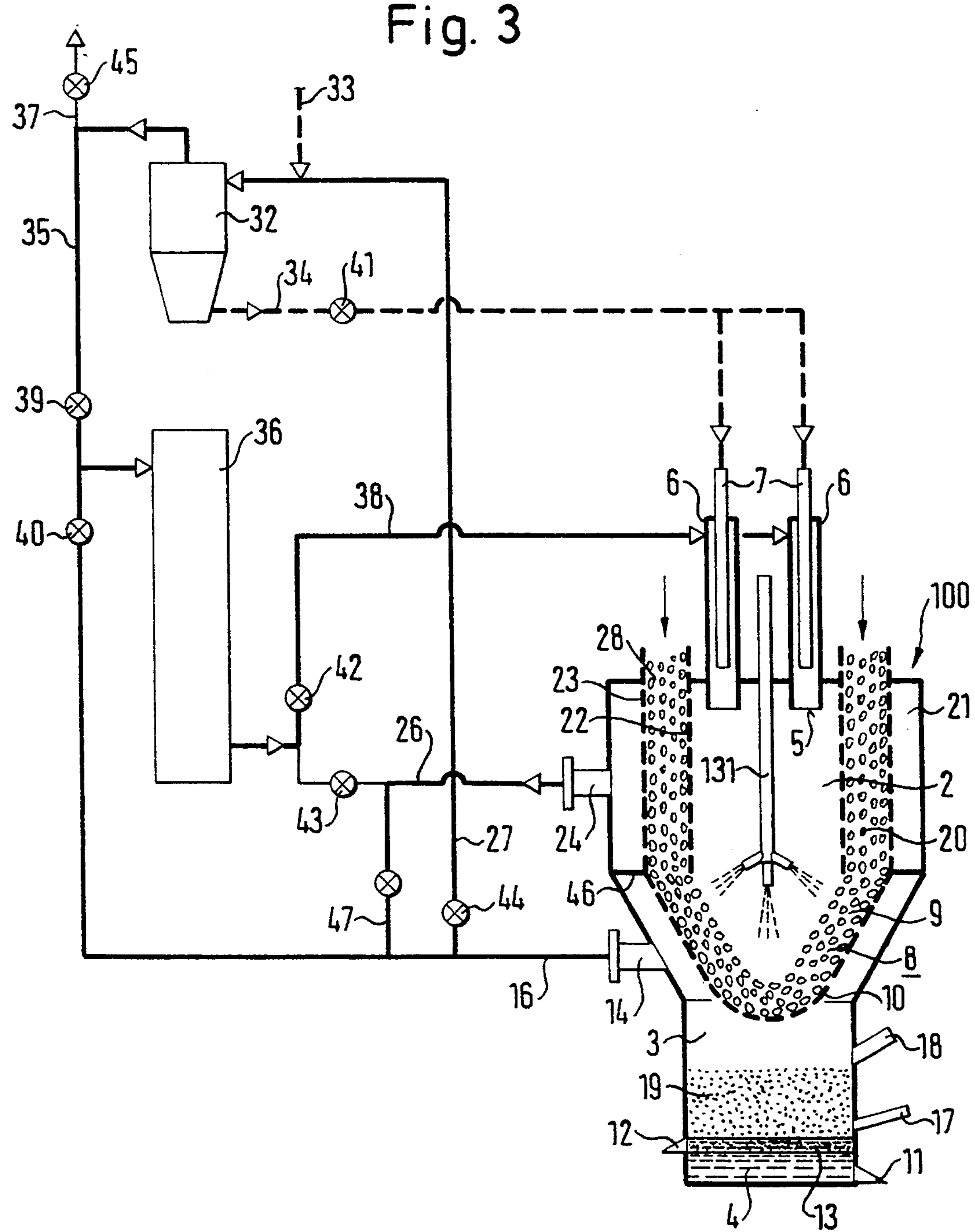

The invention is described in greater detail by means of two embodiments with reference to three diagrammatic Figures of drawings in which:

FIG. 1 shows a process diagram for the reducing phase in a cyclically operated reducing and smelting process, FIG. 2 shows the smelting and cleaning phase of that process, and FIG. 3 shows a continuous process with another configuration of the reducing and smelting furnace.

In the process diagrams shown in FIGS. 1 and 2, a reducing and smelting furnace 1 has an upper final reducing space 2 and a lower receiving space 3 for liquid metal 4. The upper final reducing space 2 has an inlet 5 through which fine-grain metal oxide particles and reducing gas can be injected into the final reducing space 2. For that purpose, besides an upper tube 6, there is a coaxial inner tube 7 which extends towards the inlet 5 only over a part of the length of the outer tube 6 and the reducing gas is fed to the annular space between the outer tube 6 and the inner tube 7 and the fine-grain metal oxide particles are fed to the inner tube 7.

The final reducing space 2 is separated from the receiving space 3 by a partition wall 8 which is formed by a bulk material filter layer 9 of coal in lump or piece form, in particular coke, and/or ceramic pieces, and represents a gas and material passage between the final reducing space 2 and the receiving space 3. The material of the bulk material filter layer is held by a fluid-cooled support grid 10. The grid is of such a configuration as to converge downwardly between the two spaces. In that way, a filter layer 9 of almost uniform thickness can be formed and maintained in the region of the partition wall 8 by virtue of the angle of repose of the material of the filter layer, without an upper boundary provided by a support grid.

The receiving space 3 has a tap opening 11 for the liquid metal 4 and a tap opening 12 for slag 13 which floats on the liquid metal 4. In the upper region the receiving space 3 also has a plurality of gas outlets 14 which are arranged in a distributed array around the periphery and which open into a collecting conduit 15 by way of which waste gas can be removed from the receiving space 3 by means of a conduit 16.

At least one nozzle 17 for injecting an oxygen-bearing gas, possibly mixed with fine coal, opens in the lower region, immediately above the maximum level of the surface of the bath. Disposed thereabove in the side wall of the receiving space is a charging opening 18 for carbonaceous material, by way of which coal in lump form can be charged into the receiving space in order there to form a fluid bed of coal 19 above the layer of slag 13.

In the reducing and smelting furnace shown in FIGS. 1 and 2, adjoining the partition wall 8 between the two spaces 2 and 3 in an upward direction is a further curved partition wall 20 which laterally delimits the final reducing space 2 relative to an annular gas space 21. Like the lower partition wall 8, the partition wall 20 is formed by a bulk material filter layer 9 which is held by a support grid 22 and which comprises lump coal, in particular coke, and/or ceramic pieces, blending into the bulk material filter layer 9 of the partition wall 8 without any interruption. The partition wall 20 is of a configuration such as to converge upwardly so that, if the angle of repose of the material of the filter layer 9 is the same as the upper cone angle of the partition wall, the desired thickness of the filter layer 9 can be maintained, even in the upper region, without an external support grid 23 which is present in the illustrated embodiment.

Distributed around its periphery the annular gas space 2 1 has a plurality of openings 24 which are connected to a collecting conduit 25 which in turn communicates with gas conduits 26 and 27 for introducing a gas into the annular space 21 and for removing the gas therefrom. The annular gas space 21 is separated from the receiving space 3 by an annular partition wall 46; gas passages (not shown) which can be closed off can be provided in the partition wall 46 in order to be able to make a communication between the annular gas space 21 and the receiving space 3. The controllable gas passages could also be provided by by-pass conduits, which can be shut off, between the two above-mentioned spaces.

At the top the partition wall 20 includes an annular charging opening 28 for the material of the bulk material filter layer 9. The material can be fed to that charging opening through a plurality of drop pipes 29 by way of a central intake opening 30. Extending through the annular partition wall 20, distributed around the periphery thereof, are a plurality of nozzles 31 which are directed towards the inside of the lower partition wall 8. The nozzles could also be passed through the lower partition wall. Oxygen-bearing gas and possibly coal can be blown through those nozzles against the lower filter layer 9 in order there to produce a high-temperature flame.

The fine-grain metal oxide particles which can be fed to the final reducing space 2 by way of the inner tube 7 are preferably pre-reduced. For that purpose, there is provided a pre-reducing cyclone 32 to which fine-grain metal oxide particles, in particular iron oxide particles, can be fed by means of the waste gas which is removed by way of the conduit 27, from the annular gas space 21—it could also be another carrier gas. The metal oxide particles are supplied, possibly together with coal in powder form, by way of a supply conduit 33 which is connected to the waste gas conduit 27. The pre-reduced metal oxide particles leave the pre-reducing cyclone 32 through a lower outlet which communicates with the inner tube 7 by way of a conduit 34. The waste gas from the pre-reducing cyclone 32 is removed by way of an upper gas outlet which communicates through a gas conduit 35 with a gas reformer 36 or a gas conduit 37 with a waste gas chimney. The gas reformer 36 can receive selectively or jointly the waste gas from the pre-reducing cyclone 32, by way of the gas conduit 35, and the waste gas from the receiving space 3, by way of the gas conduit 16. The energy required for the gas reforming operation is also obtained from the waste gas either from the pre-reducing cyclone 32 or from the receiving space 3. For that purpose, a part of the gas flow in the conduit 35 and/or the conduit 16 is branched off, burnt with air in a combustion chamber of the reformer 36 and then passed to the waste gas chimney. That arrangement is not shown in the drawings, for the sake of enhanced clarity thereof.

The gas which is reformed in the gas reformer can be passed selectively by way of a conduit 38 into the annular space between the outer tube 6 and the inner tube 7 of the reducing and smelting furnace 1, or it can be passed by way of the conduit 26 into the collecting conduit 25. The above-described feed of pre-reduced metal oxide particles through the inner tube 7 and hot reducing gas 38 which is prepared in the gas reformer 36, by way of the annular space between the inner tube 7 and the outer tube 6 provides a flow of material which is enclosed by reducing gas and which is directed against the filter layer 9 of the lower partition wall 8 so that there is a preferred accumulation of material in that region of the final reducing space 2. The above-mentioned conduits for material and gas include conventional shut-off members 39–45. Moreover the installation includes further pieces of equipment (not shown) such as dust removers, gas scrubbers, blowers, heat exchangers etc.

The performance of a cyclic process will now be described with reference to FIGS. 1 and 2, FIG. 1 showing the reducing phase and FIG. 2 showing the smelting and cleaning phase. The conduits which are switched into the active condition are respectively shown in bold.

In the reducing phase, fine ore mixed with coal is fed to the prereducing cyclone 32 by way of the conduit 33 and waste gas from the final reducing space 2 is supplied by way of the conduit 27. The fine ore is preheated to about 850° C. in the pre-reducing cyclone 32 and pre-reduced to a residual oxygen content of about 55%. Instead of the pre-reducing cyclone 32, it is also possible to use a plurality of cyclones, conventional circulating fluidised beds or other known apparatuses for pre-reduction of fine ore.

The pre-reduced fine ore is blown by way of the inner tube 7 together with fresh reducing gas through the inlet 5 into the final reducing space 2. The fresh reducing gas is supplied from the gas reformer 36 by way of the conduit 38 and is at a temperature of about 950° C. and is of a composition of $CO+H_2>90\%$. Although for reasons of reaction speed the gas temperature should lie above the temperature at which a substantial 'sticking effect' occurs in the final reducing space, the process can also be used with advantage at lower gas temperatures. In comparison with fine ore reduction in fluidised beds or cyclones, the fine-grain particles which are deposited on the filter layer can be exposed, more intensively and for a longer period of time, to the hot reducing gases which flow through the filter layer.

The gas which is loaded with the pre-reduced fine ore impinges on the previously heated filter layer 9 of the partition wall 8, which is supported on the support grid 10. While the gas passes through the filter layer, the fine-grain particles remain clinging thereto, by virtue of their sticking tendency, and as a result can be held for a sufficiently long period of time in contact with the reducing gas which is not only drawn off through the lower filter layer 9 of the partition wall 8 into the receiving space 3 and from there into the collecting conduit 15, but also by way of the upper filter layer 9 of the partition wall 20 into the annular gas space 21 and from there into the collecting conduit 25. The Gas which is drawn off through the collecting conduit 15 passes to the reformer 36 by way of the gas conduit 16 and is there processed to provide the reducing gas which is supplied by way of the conduit 38. The gas which is taken off by way of the collecting conduit 25 passes to the pre-reducing cyclone by way of the gas conduit 27. The waste gas from the cyclone can additionally be fed to the gas reformer 36 by way of the gas conduit 35 or to the waste gas chimney by way of the conduit 37.

When, by virtue of the filter layer 9 becoming clogged with the fully reduced fine ore, the pressure drop in respect of the gases taken from the reducing and smelting furnace has reached a predetermined limit, that reducing phase is followed by the smelting and cleaning phase which is shown in the process diagram illustrated in FIG. 2.

In this phase, cold or preheated oxygen-bearing gas, preferably together with a fuel such as coal dust, is blown through the nozzles 31 against the filter layer 9 of the partition wall 8 and in that way a high-temperature flame is produced at a temperature of between 2000° and 2500° C., by which the metallised particles which are retained on and in the filter layer are melted and pass in the liquid condition through the filter layer into the receiving space 3. At the same time the filter layer is heated above the liquidus temperature of the metal and cleaned. In the illustrated embodiment, during this phase, the feed of pre-reduced material to the inner tube 7 and the injection of reducing gas by way of the conduit 38 are interrupted and instead the reducing gas from the gas reformer 36, to which the gas from the receiving space 3 continues to be supplied by way of the conduit 16, is now injected into the annular gas space 21 by means of the conduit 26. By reversal of the flow of gas through the filter layer 9 of the upper partition wall 20, the filter layer is also cleaned in that region, in other words, any pre-reduced fine ore which is still in a loose condition and which is clinging thereto is conveyed into the final reducing space 2 where it passes into the smelting region, upon the discharge of gas through the filter layer 9 of the lower partition wall 8.

The smelting operation is effected in part by virtue of the radiation of the high-temperature flame and in part by virtue of convection with the subsequent flow of the hot waste gases through the filter layer. With surplus carbon from injected coal and coke in the filter layer, the procedure involves substantial reduction of $CO_2+H_2O$ to $CO+H_2$, with a reduction in temperature of the gases which are taken off by way of the collecting conduit 15. As the initially highly heated gas from the high-temperature flame which causes liquefaction of the iron on the filter layer is cooled down again in the coke of the filter layer as a result of the Boudouard reaction, heat losses can be kept at a low level and the degree of thermal efficiency can be enhanced.

The material of the filter layer is subjected to consumption in the region of the partition wall—coke in the filter layer is consumed by the Boudouard reaction and ceramic pieces are melted—so that the filter layer must be either periodically or continuously replaced in the region of the partition wall 8. In the illustrated embodiment, that is done by the filter layer 9 being extended upwardly in the region of the curved partition wall 20 and continuously supplemented by way of the drop tubes 29.

A particular advantage of the reducing and smelting furnace shown in FIGS. 1 and 2 is that the refractory material of the furnace—it is not shown in the diagrammatic Figures of the drawings—is shielded relative to the high flame temperatures required for the fusing operation, by the filter layers of the lower partition wall 8 and the curved partition wall 20. The great amount of heat which occurs in the smelting and cleaning phase in the final reducing space 2 is absorbed by the filter layers and the water-cooled support grids 10 and 22 respectively, a further cooling action being produced by the reducing gas which is injected in the reversal phase by way of the annular gas space 21 in the filter layer of the upper partition wall 20.

The liquid iron which has passed through the filter layer 9 of the partition wall 8 in the smelting and cleaning phase drips into the receiving space 2 where it is collected at the bottom in the form of a molten bath 4. In order to maintain a sufficiently high temperature in the molten bath or to increase the temperature thereof to the tapping temperature, oxygen-bearing gas is injected by way of the nozzle 17 and a fluid bed 19 of coal is formed above the injection zone by a feed of coal by way of the charging opening 18. In that way additional reducing gas is produced, which is removed by way of the collecting conduit 15 and fed to the gas reformer 36.

After the smelting and cleaning phase the filter layer 9 is cleaned and heated, and the reducing phase which was described with reference to FIG. 1 is again effected. For that purpose the shut-off members 39–45 are correspondingly switched over.

Although a cyclic process with reducing phase and smelting phase was described with reference to FIGS. 1 and 2, those two phases, with suitable matching, could also be combined together to provide a continuous process. In that case, oxygen-bearing gases and coal are injected through the nozzles 31 continuously or only with brief interruptions, and the material which clings to the filter layer 9 of the lower partition wall 8 is continuously melted.

FIG. 3 also shows a continuous procedure with a modified embodiment of the reducing and smelting furnace. Parts which correspond to those of the first embodiment are identified by the same reference numerals and are no longer described separately. In the reducing and smelting furnace 100 shown in FIG. 3 the upper partition wall 20 is of a cylindrical configuration. The material of the filter layer 9 can be supplied to the annular charging opening 28 in a similar manner as described with reference to the first embodiment. The nozzles 31 for injecting the oxygen-bearing gas into the final reducing space 2 are replaced by a central tube 131 which at the lower end has a plurality of nozzle openings which are directed towards the filter layer 9 of the partition wall 8. In addition, there are a plurality of the injection device formed from the tubes 6 and 7 in the first embodiment, for pre-reduced fine ore and hot reducing gas. The coaxial tubes 6 and 7 are arranged in a distributed array around the central tube 131 within the annular charging opening 28.

In the embodiment shown in FIG. 3, pre-reduced fine ore is blown together with hot reducing gas into the final reducing space 2 through the tubes 6/7. At the same time oxygen-bearing gas and possibly coal are injected by way of the central tube 131 and, when that happens, a high-temperature flame is produced in the region directly above the filter layer 9 of the partition wall 8. The gases leave the final reducing space 2 by way of the filter layer 9 of the lower and lateral partition walls 8 and 20 and are recycled from the gas outlets 14 and 24 by way of the conduits 16 and 26/47 to the gas reformer 36. The upper filter layer 20 can be occasionally cleaned by reversal of the flow of gas by way of the conduit 26. The particles which cling to the filter layer 9 are continuously melted by the high-temperature flame and pass through the lower filter layer into the receiving space 3.

The reducing and smelting furnace described is also suitable for additionally reducing and smelting ore in lump form, which is supplied by way of the charging opening 28, mixed with the material of the filter layer 9. In this case, as upon reversal of the last-described process, the hot reducing gas from the reformer 36 is not only blown through the tubes 6 but also by way of the conduit 26 and through the inlet 24 into the annular gas space 21 and then through the cylindrical partition wall 20 into the final reducing space 2. The coke-bearing material of the filter layer 9, which is consumed in the lower region of the filter layer, is heated as it moves downwardly, and reduced by the hot reducing gas supplied to the annular space 21. When, due to consumption of the filter layer, the material moves out of the region of the cylindrical partition wall 20 into the region of the lower partition wall 8, it is melted due to the heat which is generated there by the high-temperature flame, and, together with the reduced material from the final reducing space, it drips into the receiving space 3. In the described embodiments the filter layer is adjusted to a thickness of between 20 and 50 cm in the lower region, that is to say in the region of the partition wall 8.

I claim:

1. A process for the production of liquid metal from metal oxide particles, wherein the metal oxide particles are blown together with hot reducing gas into a final reducing space of a final reducing stage, said process comprising the steps of passing the hot reducing gas which is loaded with the particles through a heated bulk material filter layer of solid lump form material, retaining a substantial proportion of the particles on and in the filter layer, finishing reducing the particles by subjecting the particles to the reducing gas, a flame in front: of the filter layer by blowing an oxygen-bearing gas against the filter layer, to melt the metallised particles which are retained on and in the filter layer, to pass the melted particles in the liquid condition through the filter layer and into a receiving space for liquid metal and at the same time heating the filter layer above the liquidus temperature of the metal to clean the filter layer.

2. A process as set forth in claim 1 comprising the further step that prior to being injected into the final reducing space the metal oxide particles are heated and pre-reduced in a pre-reducing space of a pre-reducing stage by reducing hot gases in a fluidised bed.

3. A process as set forth in claim 2 wherein the pre-reducing step includes reducing the metal oxide particles in the pre-reducing stage to a residual oxygen content of between 40 and 60%.

4. A process as set forth in claim 2 wherein the pre-reducing step includes heating the metal oxide particles in the pre-reducing stage to between 750° and 850° C.

5. A process as set forth in claim 1 wherein the step of finishing reducing the particles includes injecting into the final reducing space reducing gas which is at a temperature of between 850° and 950° C.

6. A process as set forth in claim 1 including the further step of forming a fluid bed of coal in the receiving space for the liquid metal by injecting oxygen-bearing gases above the metal bath, and feeding coal into the receiving space.

7. A process as set forth in claim 2 including the further step of feeding the hot waste gases from the receiving space for the liquid metal to the pre-reducing space for producing the reducing gas.

8. A process as set forth in claim 2 including the further step of feeding the waste gases of the pre-reducing space to a gas reformer for producing the reducing gas.

9. A process as set forth in claim 1 wherein the step of passing a gas through a filter layer includes the steps of providing the filter layer with an upper and a lower region to define a final reducing space therein, introducing reducing gas into an upper portion of the final reducing space and passing the reducing gas through the lower region of the filter layer.

10. A process as set forth in claim 9 wherein the step of introducing the reducing gas includes periodically alternately injecting reducing gas loaded with pre-reduced metal oxide particles and oxygen-bearing gas into the final reducing space.

11. A process as set forth in claim 1 including the further steps of providing the bulk material filter layer on or between support grids and replacing consumed material of the filter layer by a periodic or continuous feed of fresh material.

12. A process as set forth in claim 11 wherein the step of replacing consumed material includes providing coarse-grain or lump metal oxide particles to the filter layer.

13. A process according to claim 1 wherein the step of retaining particles on and in the filter layer includes the step of providing the filter layer with a layer of lump coal.

14. A process according to claim 13 wherein the step of providing the filter layer with a layer of lump coal includes providing the filter with a layer of coke.

15. A process according to claim 1 wherein the step of retaining particles on and in the filter layer includes the step of providing the filter layer with a layer of ceramic pieces.

16. A process according to claim 1 wherein the step of passing a gas loaded with particles includes passing a gas loaded with iron oxide particles.

* * * * *